(12) United States Patent
Sun et al.

(10) Patent No.: US 12,073,828 B2
(45) Date of Patent: Aug. 27, 2024

(54) METHOD AND APPARATUS FOR SPEECH SOURCE SEPARATION BASED ON A CONVOLUTIONAL NEURAL NETWORK

(71) Applicant: Dolby Laboratories Licensing Corporation, San Francisco, CA (US)

(72) Inventors: Jundai Sun, Beijing (CN); Zhiwei Shuang, Beijing (CN); Lie Lu, Dublin, CA (US); Shaofan Yang, Beijing (CN); Jia Dai, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 280 days.

(21) Appl. No.: 17/611,121

(22) PCT Filed: May 13, 2020

(86) PCT No.: PCT/US2020/032762
§ 371 (c)(1),
(2) Date: Nov. 12, 2021

(87) PCT Pub. No.: WO2020/232180
PCT Pub. Date: Nov. 19, 2020

(65) Prior Publication Data
US 2022/0223144 A1    Jul. 14, 2022

Related U.S. Application Data

(60) Provisional application No. 62/856,888, filed on Jun. 4, 2019.

(30) Foreign Application Priority Data

May 14, 2019   (WO) ................ PCT/CN2019/086769
Jul. 24, 2019   (EP) ..................................... 19188010

(51) Int. Cl.
*G10L 15/20* (2006.01)
*G06N 3/08* (2023.01)
(Continued)

(52) U.S. Cl.
CPC ................ *G10L 15/20* (2013.01); *G06N 3/08* (2013.01); *G10L 15/16* (2013.01); *G10L 15/22* (2013.01); *G10L 21/0308* (2013.01); *G10L 25/18* (2013.01)

(58) Field of Classification Search
CPC ......... G10L 15/20; G10L 15/16; G10L 15/22; G10L 21/0308; G10L 25/18; G06N 3/08
See application file for complete search history.

(56) References Cited

U.S. PATENT DOCUMENTS 7,620,546 B2   11/2009   Hetherington
8,345,984 B2   1/2013   Ji
(Continued)

FOREIGN PATENT DOCUMENTS

AU   2022200439 A1 *   9/2022   ......... G06K 9/00228
CN   108363753 A *   8/2018   ............. G06F 16/35
(Continued)

OTHER PUBLICATIONS

Chakrabarty, S. et al "Time-Frequency Masking Based Online Multi-Channel Speech Enhancement with Convolutional Recurrent Neural Networks" IEEE Journal of Selected Topics in Signal Processing, vol. 13, Issue 4, 2019, pp. 787-799.
(Continued)

*Primary Examiner* — Mohammad K Islam (57) ABSTRACT

Described herein is a method for Convolutional Neural Network (CNN) based speech source separation, wherein the method includes the steps of: (a) providing multiple frames of a time-frequency transform of an original noisy speech signal; (b) inputting the time-frequency transform of
(Continued)

said multiple frames into an aggregated multi-scale CNN having a plurality of parallel convolution paths; (c) extracting and outputting, by each parallel convolution path, features from the input time-frequency transform of said multiple frames; (d) obtaining an aggregated output of the outputs of the parallel convolution paths; and (e) generating an output mask for extracting speech from the original noisy speech signal based on the aggregated output. Described herein are further an apparatus for CNN based speech source separation as well as a respective computer program product comprising a computer-readable storage medium with instructions adapted to carry out said method when executed by a device having processing capability.

26 Claims, 6 Drawing Sheets

(51) Int. Cl.
  *G10L 15/16* (2006.01)
  *G10L 15/22* (2006.01)
  *G10L 21/0308* (2013.01)
  *G10L 25/18* (2013.01)

(56) References Cited

U.S. PATENT DOCUMENTS

| | | | |
|---|---|---|---|
| 9,064,498 | B2 | 6/2015 | Uhle |
| 9,190,053 | B2 | 11/2015 | Penn |
| 9,251,783 | B2 | 2/2016 | Kalinli-Akbacak |
| 9,536,540 | B2 | 1/2017 | Avendano |
| 9,836,455 | B2 * | 12/2017 | Martens ............... G06F 40/279 |
| 10,242,665 | B1 * | 3/2019 | Abeloe ................ G06N 3/047 |
| 10,460,747 | B2 | 10/2019 | Roblek |
| 10,573,312 | B1 * | 2/2020 | Thomson ............... G10L 15/22 |
| 11,182,545 | B1 * | 11/2021 | Tsai ..................... G06N 20/10 |
| 11,657,222 | B1 * | 5/2023 | Anthony ............ G06F 40/279 706/12 |
| 11,748,613 | B2 * | 9/2023 | Li ........................ G06F 40/30 704/9 |
| 2002/0026315 | A1 * | 2/2002 | Miranda ............... G10L 13/04 704/E13.007 |
| 2010/0004934 | A1 * | 1/2010 | Hirose ................. G10L 19/04 704/E13.001 |
| 2011/0202355 | A1 * | 8/2011 | Grill .................... G10L 19/18 704/E21.001 |
| 2017/0162194 | A1 | 6/2017 | Nesta |
| 2017/0330586 | A1 | 11/2017 | Roblek |
| 2018/0061395 | A1 * | 3/2018 | Ding ................... G10L 15/183 |
| 2018/0129893 | A1 * | 5/2018 | Son ..................... G06N 3/063 |
| 2018/0137857 | A1 * | 5/2018 | Zhou ................... G10L 15/16 |
| 2018/0190268 | A1 * | 7/2018 | Lee ..................... G10L 15/02 |
| 2018/0261214 | A1 | 9/2018 | Gehring |
| 2018/0308487 | A1 * | 10/2018 | Goel .................. G10L 15/1815 |
| 2018/0365248 | A1 * | 12/2018 | Zheng ................. G06F 40/216 |
| 2019/0251952 | A1 | 8/2019 | Arik |
| 2019/0266998 | A1 * | 8/2019 | Liang .................. G10L 15/16 |
| 2019/0279036 | A1 | 9/2019 | Pan |
| 2020/0027442 | A1 | 1/2020 | Mathur |
| 2020/0042580 | A1 * | 2/2020 | Davis ................... G06F 16/93 |
| 2020/0111023 | A1 * | 4/2020 | Pondicherry Murugappan ........... G06N 5/02 |
| 2020/0126534 | A1 * | 4/2020 | Yoo .................... G10L 25/30 |
| 2020/0160123 | A1 * | 5/2020 | Dennison ............ G06F 18/2148 |
| 2020/0160836 | A1 | 5/2020 | Chen |
| 2020/0193297 | A1 * | 6/2020 | Verhoef ................ G06N 3/084 |
| 2020/0234044 | A1 * | 7/2020 | Cai ....................... G06V 10/24 |
| 2020/0242445 | A1 * | 7/2020 | de Vangel ............ G06N 3/04 |
| 2020/0311205 | A1 * | 10/2020 | Büttner ................ G06F 40/216 |
| 2020/0342287 | A1 * | 10/2020 | Xu ....................... G06V 10/774 |
| 2020/0357392 | A1 * | 11/2020 | Zhou .................. G10L 15/1822 |
| 2021/0074264 | A1 * | 3/2021 | Liang .................. G10L 15/28 |
| 2021/0201018 | A1 * | 7/2021 | Patel .................... G06F 18/22 |
| 2021/0209142 | A1 * | 7/2021 | Tagra .................. G06N 3/044 |
| 2023/0004604 | A1 * | 1/2023 | Li ......................... G06F 18/22 |
| 2023/0069587 | A1 * | 3/2023 | Lukyanenko .......... G06F 40/35 |
| 2023/0139831 | A1 * | 5/2023 | Wang ................. G06V 30/1444 704/9 |

FOREIGN PATENT DOCUMENTS

| | | | | |
|---|---|---|---|---|
| CN | 110222182 | A * | 9/2019 | ............ A63F 13/70 |
| CN | 115426055 | A * | 12/2022 | ............... G06N 3/08 |
| JP | 2019020598 | A | 2/2019 | |
| WO | 2007014136 | A2 | 2/2007 | |
| WO | 2014195132 | A1 | 12/2014 | |
| WO | 2015157013 | A1 | 10/2015 | |
| WO | 2017052739 | A1 | 3/2017 | |
| WO | 2020128134 | A1 | 6/2020 | |
| WO | 2020232180 | A1 | 11/2020 | |
| WO | WO-2023220437 | A1 * | 11/2023 | ........... A61B 5/1118 |

OTHER PUBLICATIONS

Boll, Steven "Suppression of Acoustic Noise in Speech Using Spectral Subtraction" IEEE Transactions on Acoustics, Speech and Signal Processing, vol. ASSP-27, No. 2, Apr. 1979, pp. 113-120.

Gu, J. et al "Recent Advances in Convolutional Neural Networks" vol. 77, Oct. 11, 2017, pp. 354-377.

Hu, G. et al "A Tandem Algorithm for Pitch Estimation and Voiced Speech Segregation" IEEE Transactions on Audio, Speech, and Language processing, vol. 18, No. 8, Nov. 2010, pp. 2067-2079.

Kounovsky, T. et al "Single Channel Speech Enhancement Using Convolutional Neural Network" IEEE International Workshop of Electronics, Control, Measurement, Signals and their Application to Mechatronics, May 24, 2017, pp. 1-5.

Madhu, N. et al. "Temporal smoothing of spectral masks in the cepstral domain for speech separation" Acoustics, Speech and Signal Processing, 2008. ICASSP 2008. IEEE International Conference On, IEEE, Piscataway, NJ, USA, Mar. 31, 2008 (Mar. 31, 2008), pp. 45-48.

Mitra, V. et al "Time-Frequency Convolutional Networks for Robust Speech Recognition" IEEE Workshop on Automatic Speech Research, Dec. 13-17, 2015.

Wang, De Liang, et al "Supervised Speech Separation Based on Deep Learning: An Overview" IEEE/ACM Transactions On Audio, Speech, and Language Processing, vol. 26, No. 10, Oct. 2018, pp. 1702-1726.

Weninger, F. et al "Discriminatively trained recurrent neural networks for single-channel speech separation"2014 IEEE Global Conference On Signal and Information Processing (GLOBALSIP), Dec. 2014 (Dec. 5, 2014), pp. 577-581.

Jin et al., "Development of Emotion Rankers Based on Intended and Perceived Emotion Labels," Interspeech 2019, Sep. 15-19, 2019, Graz, Austria, 5 pages.

Jha Debesh et al: "DoubleU-Net: A Deep Convolutional Neural Network for Medical Image Segmentation" , 2020 IEEE 33RD International Symposium On Computer-Based Medical Systems (CBMS), IEEE, Jul. 28, 2020 (Jul. 28, 2020), pp. 558-564, XP033817802, DOI: 10.1109/CBMS49503.2020.00111 [retrieved on Aug. 31, 2020] * section 3; figure 1 * , 7 pages.

K. Tan and D. Wang, "Complex spectral mapping with a convolutional recurrent network for monaural speech enhancement," in ICASSP 2019-2019 IEEE International Conference on Acoustics, Speech and Signal Processing (ICASSP). IEEE, 2019, pp. 6865-6869, 5 pages.

Liang-Chieh Chen et al: "DeepLab: Semantic Image Segmentation with Deep Convolutional Nets, Atrous Convolution, and Fully Connected CRFs", IEEE Transactions On Pattern Analysis and Machine Intelligence, vol. 40, No. 4, Apr. 1, 2018 (Apr. 1, 2018), pp. 834-848, XP055699398, USA ISSN: 0162-8828, DOI: 10.1109/TPAMI.2017.2699184 the whole document, 10 pages.

Liu Jia et al: "A Cascaded Deep Convolutional Neural Network for Joint Segmentation and Genotype Prediction of Brainstem Gliomas" , IEEE Transactions On Biomedical Engineering, IEEE (56) References Cited

OTHER PUBLICATIONS

Service Center, Piscataway, NJ, USA, vol. 65, No. 9, Sep. 1, 2018 (Sep. 1, 2018), pp. 1943-1952, XP011691463, ISSN: 0018-9294, DOI: 10.1109/TBME.2018.2845706 [retrieved on Aug. 17, 2018] * section II.B; figure 1 *, 10 pages.

Ronneberger, O. et al. "U-net: Convolutional networks for biomedical image segmentation," in International Conference on Medical image computing and computer-assisted intervention. Springer, 2015, pp. 234-241, 8 pages.

Xi Fang et al: "Multi-organ Segmentation over Partially Labeled Datasets with Multi-scale Feature Abstraction", Arxiv.Org, Cornell University Library, 201 Olin Library Cornell University Ithaca, NY 14853, Jun. 6, 2020 (Jun. 6, 2020), XP081681686, * section III.A; figure 3; table 1 *, 11 pages.

Zhu Booing et al: "Learning Environmental Sounds with Multi-scale Convolutional Neural Network", 2018 International Joint Conference On Neural Networks (IJCNN), IEEE, Jul. 8, 2018 (Jul. 8, 2018), pp. 1-8, XP033419444, DOI: 10.1109/IJCNN.2018.8489641 [retrieved on Oct. 10, 2018], 7 pages.

\* cited by examiner

METHOD AND APPARATUS FOR SPEECH SOURCE SEPARATION BASED ON A CONVOLUTIONAL NEURAL NETWORK

CROSS-REFERENCE TO RELATED APPLICATIONS

This application claims priority to International Patent Application No. PCT/CN2019/086769, filed on 14 May 2019; U.S. Provisional Patent Application No. 62/856,888, filed on 4 Jun. 2019 and European Patent Application No. 19188010.3, filed on 24 Jul. 2019, each of which is hereby incorporated by reference in its entirety.

TECHNOLOGY

The present disclosure relates generally to a method and apparatus for Convolutional Neural Network (CNN) based speech source separation, and more specifically to improving the extraction of speech from original noisy speech signals using an aggregated multi-scale CNN.

While some embodiments will be described herein with particular reference to that disclosure, it will be appreciated that the present disclosure is not limited to such a field of use and is applicable in broader contexts.

BACKGROUND

Any discussion of the background art throughout the disclosure should in no way be considered as an admission that such art is widely known or forms part of common general knowledge in the field.

Speech source separation aims at recovering target speech from background interferences and finds many applications in the field of speech and/or audio technologies. In this context, speech source separation is also commonly known as the "cocktail party problem". Challenges arise in this scenario in the extraction of dialog from professional content such as, for example, movie and TV due to the complex background.

Currently, most separation methods focus on stationary background or noise, only. Two traditional approaches for monaural speech separation are speech enhancement and computational auditory scene analysis (CASA).

The simplest and most widely used enhancement method is spectral subtraction [S. F. Boll "Suppression of acoustic noise in speech using spectral subtraction," IEEE Trans. Acoust. Speech Sig. Process., vol. 27, pp. 113-120, 1979], where the power spectrum of the estimated noise is subtracted from that of noisy speech. The background estimation assumes that background noise is stationary, i.e., its spectral properties do not change abruptly over time, or at least are more stationary than speech. This assumption, however, invokes a limitation when the method is applied to process professional content.

CASA works by using perceptual principles of auditory scene analysis and exploiting grouping cues such as pitch and onset. For example, the tandem algorithm separates voiced speech by alternating pitch estimation and pitch-based grouping [G. Hu and D. L. Wang, "A tandem algorithm for pitch estimation and voiced speech segregation," IEEE Trans. Audio Speech Lang. Proc., vol. 18, pp. 2067-2079, 2010].

A more recent approach treats speech separation as a supervised learning problem which benefited from the rapid rise in deep learning. The original formulation of supervised speech separation was inspired by the concept of time-frequency (T-F) masking in CASA.

Deep neural networks (DNNs) have been shown to greatly improve the performance of supervised speech separation. Types of DNNs include feedforward multilayer perceptrons (MLP), convolutional neural networks (CNNs), recurrent neural networks (RNNs), and generative adversarial networks (GANs). Among these, CNNs are a class of feedforward networks.

However, despite the use of DNNs for speech separation, there is still an existing need for a robust separation method to extract dialog/speech in professional content over both stationary and unstationary (dynamic) background.

SUMMARY

In accordance with a first aspect of the present disclosure there is provided a method for Convolutional Neural Network (CNN) based speech source separation. The method may include the steps of (a) providing multiple frames of a time-frequency transform of an original noisy speech signal. The method may further include the step of (b) inputting the time-frequency transform of said multiple frames into an aggregated multi-scale CNN having a plurality of parallel convolution paths, wherein each parallel convolution path comprises one or more convolutional layers. The method may further include the step of (c) extracting and outputting, by each parallel convolution path, features from the input time-frequency transform of said multiple frames. The method may further include the step of (d) obtaining an aggregated output of the outputs of the parallel convolution paths. And the method may include the step of (e) generating an output mask for extracting speech from the original noisy speech signal based on the aggregated output.

In some embodiments, the original noisy speech signal may include one or more of high-pitch, cartoon and other abnormal speech.

In some embodiments, the time-frequency transform of said multiple frames may be subjected to a 2D convolutional layer followed by a leaky rectified linear unit (LeakyRelu) prior to inputting into the aggregated multi-scale CNN.

In some embodiments, obtaining the aggregated output in step (d) may further include applying weights to respective outputs of the parallel convolution paths.

In some embodiments, different weights may be applied to respective outputs of the parallel convolution paths based on one or more of speech and/or audio domain knowledge and trainable parameters learned from a training process.

In some embodiments, obtaining the aggregated output in step (d) may include concatenating the weighted outputs of the parallel convolution paths.

In some embodiments, obtaining the aggregated output in step (d) may include adding the weighted outputs of the parallel convolution paths.

In some embodiments, in step (c), speech harmonic features may be extracted and output by each of the parallel convolution paths.

In some embodiments, the method may further include the step of (f) post-processing the output mask.

In some embodiments, the output mask may be a one-frame spectral magnitude mask, and post-processing the output mask may include at least one of the steps of (i) limiting the output mask to $[0, \varphi]$, wherein $\varphi$ is set according to a statistical analysis of a target mask in training data; (ii) if a mean mask for a current frame is smaller than $\varepsilon$, setting the output mask to be 0; (iii) if an input is zero, setting the output mask to zero; or (iv) J*K median filtering.

In some embodiments, the output mask may be a one-frame spectral magnitude mask and the method may further include the step of (g) multiplying the output mask and a magnitude spectrum of the original noisy speech signal, conducting ISTFT and getting a way signal.

In some embodiments, generating the output mask in step (e) may include applying cascaded pooling to the aggregated output.

In some embodiments, the cascaded pooling may include one or more stages of performing a pair of a convolution layer and pooling processing, wherein the one or more stages are followed by a last convolution layer.

In some embodiments, a flattening operation may be performed after the cascaded pooling.

In some embodiments, as the pooling processing, average pooling processing may be performed.

In some embodiments, each parallel convolution path, out of the plurality of parallel convolution paths of the CNN, may include L convolution layers, wherein L is a natural number$\geq 1$, and wherein an l-th layer among the L layers may have $N_l$ filters with l=1 ... L.

In some embodiments, for each parallel convolution path, the number $N_l$ of filters in the l-th layer may be given by $N_l=1*N_0$, with $N_0$ a predetermined constant$\geq 1$.

In some embodiments, the filter size of the filters may be the same within each parallel convolution path.

In some embodiments, the filter size of the filters may be different between different parallel convolution paths.

In some embodiments, for a given parallel convolution path, prior to performing the convolution operation in each of the L convolution layers, the input may be zero padded.

In some embodiments, for a given parallel convolution path, the filters may have a filter size of n*n, or the filters may have a filter size of n*1 and 1*n.

In some embodiments, the filter size may depend on a harmonic length to conduct feature extraction.

In some embodiments, for a given parallel convolution path, the filters of at least one of the layers of the parallel convolution path may be dilated 2D convolutional filters.

In some embodiments, the dilation operation of the filters of the at least one of the layers of the parallel convolution path may be performed on the frequency axis only.

In some embodiments, for a given parallel convolution path, the filters of two or more of the layers of the parallel convolution path may be dilated 2D convolutional filters, and a dilation factor of the dilated 2D convolutional filters may increase exponentially with increasing layer number l.

In some embodiments, for a given parallel convolution path, a dilation may be (1,1) in a first of the L convolution layers, the dilation may be (1,2) in a second of the L convolution layers, the dilation may be $(1,2^{(l-1)})$ in the l-th of the L convolution layers, and the dilation may be $(1,2^{(L-1)})$ in the last of the L convolution layers, where (c,d) may indicate a dilation factor of c along the time axis and a dilation factor of d along the frequency axis.

In some embodiments, for a given parallel convolution path, in addition, a non-linear operation may be performed in each of the L convolution layers.

In some embodiments, the non-linear operation may include one or more of a parametric rectified linear unit (PRelu), a rectified linear unit (Relu), a leaky rectified linear unit (LeakyRelu), an exponential linear unit (Elu) and a scaled exponential linear unit (Selu).

In some embodiments, rectified linear unit (Relu) may be performed as the non-linear operation.

In accordance with a second aspect of the present disclosure there is provided an apparatus for Convolutional Neural Network (CNN) based speech source separation, wherein the apparatus includes a processor configured to perform the steps of the method for Convolutional Neural Network (CNN) based speech source separation.

In accordance with a third aspect of the present disclosure there is provided a computer program product comprising a computer-readable storage medium with instructions adapted to cause the device to carry out the method for Convolutional Neural Network (CNN) based speech source separation when executed by a device having processing capability.

BRIEF DESCRIPTION OF THE DRAWINGS

Example embodiments of the disclosure will now be described, by way of example only, with reference to the accompanying drawings in which.

DESCRIPTION OF EXAMPLE EMBODIMENTS

Speech Source Separation Based on an Aggregated Multi-Scale Convolutional Neural Network (CNN)

In the following, method and apparatus for Convolutional Neural Network (CNN) based speech source separation will be described. This approach is particularly valuable in the extraction of dialog from professional content such as, for example, movie or TV content. CNN based speech source separation is based on feature extraction over the spectrum of an original noisy signal with different receptive fields. Multi-scale property and multi-frame input make the model fully use temporal and frequency information.

Overview

Figure 1:
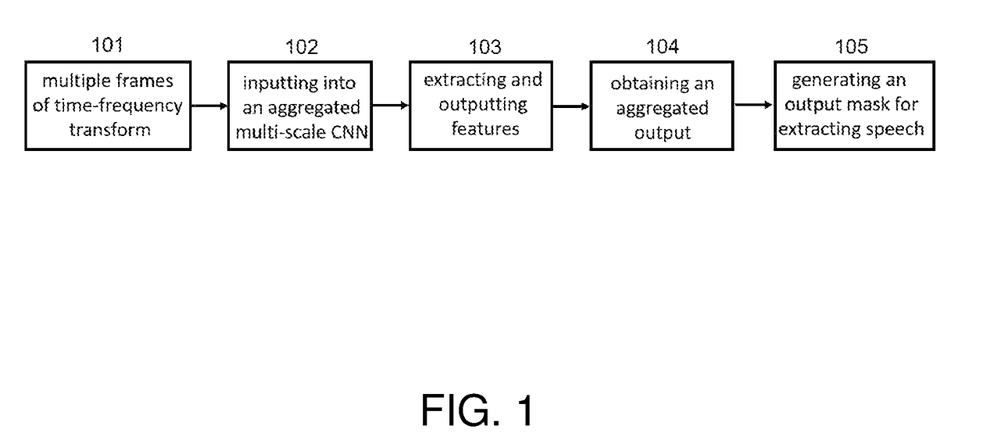
FIG. 1 illustrates a flow diagram of an example of a method for Convolutional Neural Network (CNN) based speech source separation.

Referring to the example of FIG. 1, a method for Convolutional Neural Network (CNN) based speech source separation is illustrated. In step 101, multiple frames (e.g., M frames) of a time-frequency transform of an original noisy speech signal are provided. While normal speech may be used as the original noisy speech signal, in an embodiment, the original noisy speech signal may include one or more of high-pitch, cartoon and other abnormal speech. Abnormal speech may include, e.g. emotional speech, exciting and/or angry voices, child voices used in the cartoons. Abnormal speech, high-pitch speech may be characterized by the high dynamic range of the audio and/or sparse harmonic of the audio components. While the number of frames is not limited, in an embodiment, 8 frames of a time-frequency transform of an original noisy speech signal may be provided.

Alternatively, or additionally, an N-point short time Fourier transform (STFT) may be used to provide the spectrum magnitude of speech based on the multiple frames of the original noisy speech signal. In this case, choosing N may be based on a sampling rate and an expected time length of a frame according to:

N=time length*sampling rate

There may be overlapping or no overlapping of data between two neighboring frames. Typically, a longer N may result in a better frequency resolution on the expense of an increase in computational complexity. In an embodiment, N may be chosen to be 1024 with a sampling rate of 16 kHz.

In step 102, the multiple frames of the time-frequency transform of the original noisy speech signal are input into an aggregated multi-scale CNN having a plurality of parallel convolution paths. Each convolution path comprises on or more convolutional layers, e.g. a cascade of one or more convolutional layers. The structure of the aggregated multi-scale CNN will be described in more detail below.

In step 103, features are extracted and output from the input time-frequency transform of said multiple frames by each parallel convolution path of the aggregated multi-scale CNN. In an embodiment, speech harmonic features may be extracted and output by each parallel convolution path. Alternatively, or additionally, the correlation of harmonic features in different receptive fields may be extracted.

In step 104, an aggregated output of the outputs of the parallel convolution paths is obtained. In an embodiment, obtaining the aggregated output may further include applying weights to respective outputs of the parallel convolution paths. In an embodiment, different weights may be applied based on one or more of speech and/or audio domain knowledge, or may be trainable parameters that can be learned from a training process as detailed further below.

In step 105, an output mask for extracting speech from the original noisy speech signal is generated based on the aggregated output.

Figure 2:
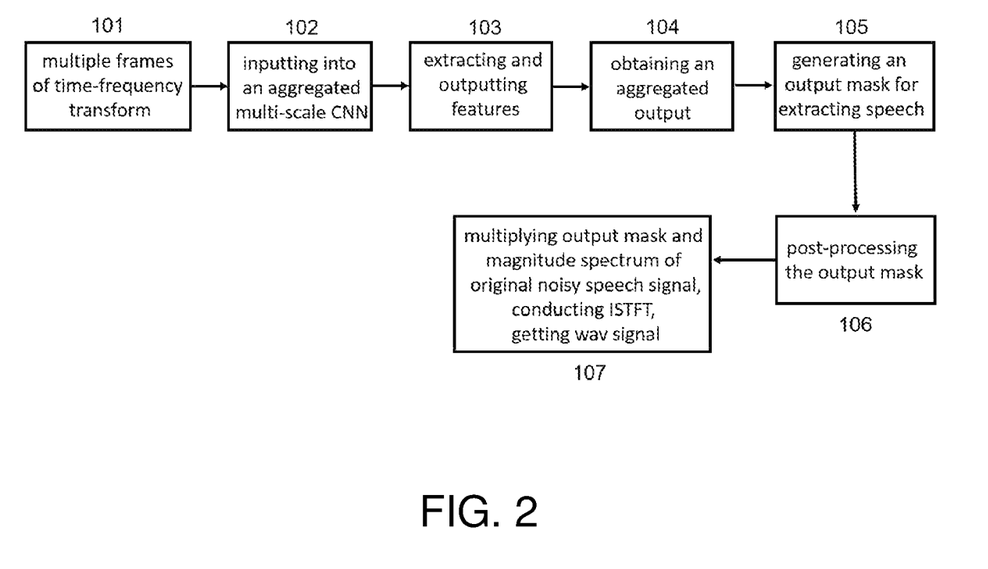
FIG. 2 illustrates a flow diagram of a further example of a method for Convolutional Neural Network (CNN) based speech source separation.

Referring to the example of FIG. 2, in an embodiment, the method for Convolutional Neural Network (CNN) based speech source separation may further include step 106 of post-processing the output mask. In an embodiment, the output mask may be a one-frame spectral magnitude mask. The one-frame spectral magnitude mask may be defined as follows:

$$\text{Spectral Magnitude Mask} = \frac{|S(t, f)|}{|Y(t, f)|}$$

wherein S(t,f) represents the spectral magnitude of clean speech and Y(t,f) represents the spectral magnitude of noisy speech. Post-processing the output mask in step 106 may then include at least one of the steps of: (i) limiting the output mask to [0, φ], wherein φ is the up limit of the soft mask estimated from the network which is set according to a statistical analysis of a target mask in training data; the soft mask stands for how much portion of speech exists in each temporal-frequency tile and is usually between 0 and 1. However, in some cases where phase cancellation occurs, the soft mask, i.e. φ, can be larger than 1. In order to avoid that the CNN generates an inappropriate mask, the soft mask is limited to the maximum value φ. Accordingly φ may be equal to 1 or larger than 1, e.g. equal to 2, or, e.g. equal to any other intermediate real number between 1 and 2; (ii) if a mean mask for a current frame is smaller than ε, setting the output mask to be 0; (iii) if an input is zero, setting the output mask to zero; or (iv) J*K median filtering. A J*K median filter is a filter with size J*K where J is the range in the frequency dimension and K is the range in the time dimension. With a median filter a target soft mask is replaced by the median of the masks, e.g. in its J*K surrounding neighbors. The median filter is used for smoothing to avoid abrupt change over frequency and time dimensions. In an embodiment, J=K=3. In other embodiments, J*K may be equal to 3*5, or 7*3, or 5*5. However, J*K may be equal to any other filter size suitable for the specific implementation of the CNN. Step (i) of post-processing ensures that the separation result does not cause audio clipping. Step (ii) of post-processing enables to remove residual noise, working as voice activation detection. Step (iii) of post-processing enables to avoid involving edge effect when median filtering in step (iv) is applied. Step (iv) of post-processing enables smoothing the output mask and removing audible artifacts. By performing post-processing, the perceptual quality of the separation result can be improved.

In step 107, in an embodiment, the output mask may be a one-frame spectral magnitude mask and the method may further include multiplying the output mask and a magnitude spectrum of the original noisy speech signal, conducting inverse short time Fourier transform (ISTFT) and getting a way signal.

The above described method for Convolutional Neural Network (CNN) based speech source separation may be implemented on a respective apparatus including a processor configured to perform said method. Alternatively, or additionally, the above described method for Convolutional Neural Network (CNN) based speech source separation may be implemented as a computer program product comprising a computer-readable storage medium with instructions adapted to cause the device to carry out said method.

Aggregated Multi-Scale Convolutional Neural Network Structure

Figure 3:
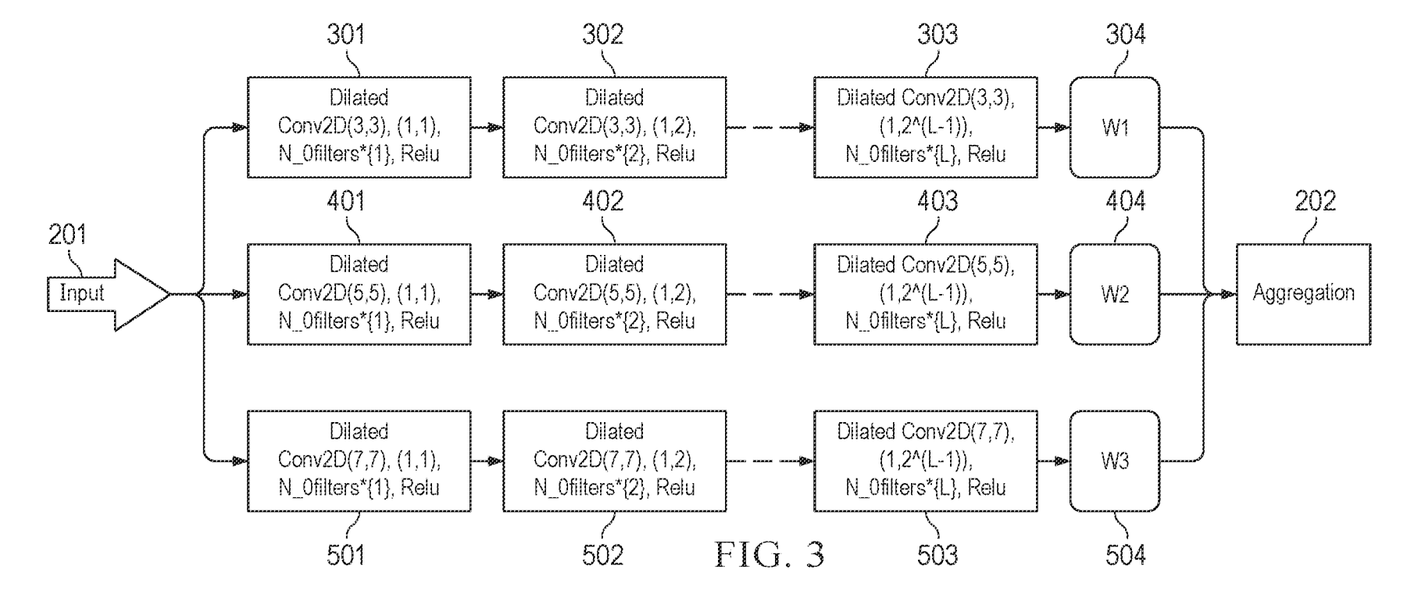
FIG. 3 illustrates an example of an aggregated multi-scale Convolutional Neural Network (CNN) for speech source separation.

Referring to the example of FIG. 3, an aggregated multi-scale Convolutional Neural Network (CNN) for speech source separation is illustrated. In the described method, a pure convolution network is utilized for feature extraction. The aggregated multi-scale CNN includes a plurality of parallel convolution paths. While the number of parallel convolution paths is not limited, the aggregated multi-scale CNN may include three parallel convolution paths. By means of these parallel convolution paths, the extraction of different, e.g. local and general, feature information of time-frequency transform of the multiple frames of the original noisy speech signal is possible in different scales.

Referring to the example in FIG. 3, in step 201, the time-frequency transform of multiple frames (e.g., M frames) of an original noisy speech signal may be input into an aggregated multi-scale CNN having a plurality of parallel convolution paths, in the example of FIG. 3 three parallel convolution paths are illustrated. N-point short time Fourier transform (STFT) may be used on the multiple frames (e.g., M frames). The input into the CNN may thus correspond to a dimension of M*(N/2+1). N may be 1024.

Figure 4:
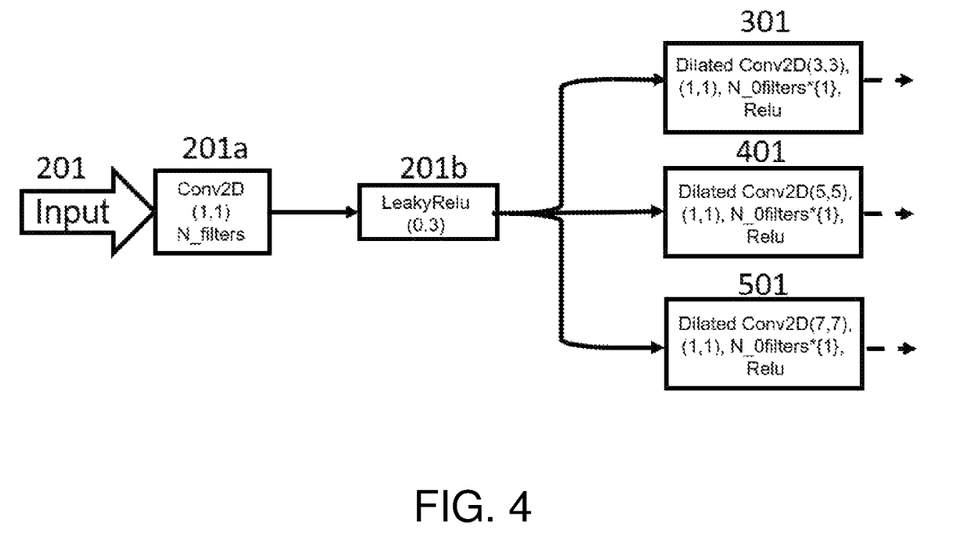
FIG. 4 illustrates an example of a part of a process flow for Convolutional Neural Network (CNN) based speech source separation.

Referring to the example of FIG. 4, in an embodiment, prior to inputting into the aggregated multi-scale CNN, in step 201, the time-frequency transform of the multiple frames of the original noisy speech signal may be subjected to a 2D convolutional layer in step 201*a*, followed by a leaky rectified linear unit (LeakyRelu) in step 201*b*. The 2D convolutional layer may have a number of N filters (also referred to as N_filters), wherein N is a natural number>1. A filter size for this layer may be (1,1). Moreover, there may be no dilation for this layer.

As illustrated in the example of FIG. 3, the time-frequency transform of the multiple frames is (parallelly) input into the plurality of parallel convolution paths in step 201. In an embodiment, each parallel convolution path, out of the plurality of parallel convolution paths of the CNN, may include L convolution layers 301,302,303,401,402,403,501, 502,503, wherein L is a natural number>1, and wherein an l-th layer among the L layers has Nl filters with l=1 . . . L. While the number of layers L in each parallel convolution path is not limited, each parallel convolution path may include, for example, L=5 layers. In an embodiment, for each parallel convolution path, the number Nl of filters in the l-th layer may be given by Nl=1*N0, with N0 being a predetermined constant>1.

In an embodiment, the filter size of the filters may be the same (i.e., uniform) within each parallel convolution path. For example, a filter size of (3,3) (i.e., 3*3) may be used in each layer L within a parallel convolution path, 301-303, out of the plurality of parallel convolution paths. By using the same filter size in each parallel convolution path, mixing of different scale features may be avoided. In this way, the CNN learns the same scale feature extraction in each path, which greatly improves the convergence speed of the CNN.

In an embodiment, the filter size of the filters may be different between different parallel convolution paths 301-303, 401-403, 501-503. For example, without intended limitation, if the aggregated multi-scale CNN includes three parallel convolution paths, the filters size may be (3,3) in the first parallel convolution path, 301-303, (5,5) in the second parallel convolution path, 401-403, and (7,7) in the third parallel convolution path, 501-503. However, other filter sizes are feasible as well, wherein also the same filter size may be used within respective parallel convolution paths and different filter sizes may be used between different parallel convolution paths. The different filter sizes of the filters of the different parallel convolution paths represent the different scales of the CNN. In other words, by using multiple filter sizes multi-scale processing is possible. For example, when the size of the filter is small (e.g. 3*3) a small range of information is processed around the target frequency-temporal tile while when the size of the filter is large (e.g. 7*7) a large range of information is processed. Processing a small range of information is equivalent to extracting so called 'local' features. Processing a large range of information is equivalent to extracting so called 'general' features. It has been found by the inventors that features extracted by different filter sizes have different properties. Using large filter size intends to preserve more harmonics of speech but also retains more noise, while using smaller filter size preserves more the key components of speech and removes noise more aggressively.

In an embodiment, the filter size may depend on a harmonic length to conduct feature extraction.

In an embodiment, for a given convolution path, prior to performing the convolution operation in each of the L convolution layers, the input to each layer may be zero padded. In this way, the same data shape from input to output can be maintained.

In an embodiment, for a given parallel convolution path, in addition, a non-linear operation may be performed in each of the L convolution layers. While the non-linear operation is not limited, in an embodiment, the non-linear operation may include one or more of a parametric rectified linear unit (PRelu), a rectified linear unit (Relu), a leaky rectified linear unit (LeakyRelu), an exponential linear unit (Elu) and a scaled exponential linear unit (Selu). In an embodiment, rectified linear unit (Relu) may be performed as the non-linear operation. The non-linear operation may be used as activation in each of the L convolution layers.

In an embodiment, for a given parallel convolution path, the filters of at least one of the layers of the parallel convolution path may be dilated 2D convolutional filters. The use of dilated filters enables to extract the correlation of harmonic features in different receptive fields. Dilation enables to reach far receptive fields by jumping (i.e., skipping, leaping over) a series of time-frequency (TF) bins. In an embodiment, the dilation operation of the filters of the at least one of the layers of the parallel convolution path may be performed on the frequency axis only. For example, a dilation of (1,2) in the context of this disclosure may indicate that there is no dilation along the time axis (dilation factor 1), while every other bin in the frequency axis is skipped (dilation factor 2). In general, a dilation of (1,d) may indicate that (d−1) bins are skipped along the frequency axis between bins that are used for the feature extraction by the respective filter.

In an embodiment, for a given convolution path, the filters of two or more of the layers of the parallel convolution path may be dilated 2D convolutional filters, wherein a dilation factor of the dilated 2D convolutional filters increases exponentially with increasing layer number l. In this way, an exponential receptive field growth with depth can be achieved. As illustrated in the example of FIG. 3, in an embodiment, for a given parallel convolution path, a dilation may be (1,1) in a first of the L convolution layers, the dilation may be (1,2) in a second of the L convolution layers, the dilation may be $(1,2^{(l-1)})$ in the l-th of the L convolution layers, and the dilation may be $(1,2^{(L-1)})$ in the last of the L convolution layers, where (c,d) indicates a dilation factor of c along the time axis and a dilation factor of d along the frequency axis.

The aggregated multi-scale CNN may be trained. Training of the aggregated multi-scale CNN may involve the following steps:

(i) Calculate frame FFT coefficients of original noisy speech and target speech;

(ii) Get the magnitude of the noisy speech and the target speech by ignoring the phase;

(iii) Get the target output mask by calculating the difference between the magnitude of the noisy speech and the target speech as follows:

$$\text{Target mask} = \|Y(t, f)\|/\|X(t, f)\|$$

where Y(t,f) and X(t,f) represent the spectrum magnitude of target speech and noisy speech;

(iv) Limit the target mask to a small range according to a statistic histogram;

The value range of the initial target mask may be very large caused by a negative correlation between target speech and interference. Based on the statistic results, the mask located in [0,2] may occupy about 90%, and the mask located in [0,4] may occupy about 98%. According to training results, the mask may be limited to [0,2] or [0,4]. The statistical results may be related to the speech and background type, mask limitation, however, may be of importance for training the CNN.

(v) Use multiple frame frequency magnitude of noisy speech as input;

(vi) Use the corresponding target mask of step (iii) as output.

For training the aggregated multi-scale CNN, high-pitch, cartoon and other abnormal speech may be covered to increase the robustness.

Path Weighting and Aggregating

Referring to the example of FIG. 3, from steps 303, 403, 503, the features extracted in each of the parallel convolution paths of the aggregated multi-scale CNN from the time-frequency transform of the multiple frames of the original noisy speech signal input in step 201 are output. The outputs from each of the parallel convolution paths are then aggregated in step 202 to obtain aggregated outputs.

In an embodiment, the step of obtaining the aggregated output may include applying weights, 304 (W1), 404 (W2), 504 (W3), to the respective outputs 303, 403, 503, of the parallel convolution paths. In an embodiment, different weights, 304 (W1), 404 (W2), 504 (W3), may be applied to the respective outputs of the parallel convolution paths based on one or more of speech and/or audio domain knowledge and trainable parameters learned from a training process. The trainable parameters may be obtained during the training process of the aggregated multi-scale CNN, wherein the trainable parameters may be the weights themselves which can be directly learned from the whole training process jointly with other parameters.

In general, larger filter size of the CNN may keep more speech components while involving more noise while smaller filter size may only retain some key components of speech while removing more noise. For example, if a larger weight is chosen for the path with the larger filter size, the model may be relatively more conservative and have relatively better speech preservation at the cost of more residual noise. On the other hand, if a larger weight is chosen for the path with the smaller filter size, the model may be more aggressive on noise removal and may also loose some speech component. Applying weights to the outputs of the parallel convolution paths may thus serve to control the aggressiveness of the CNN, e.g. by achieving the preferred trade-off between speech preservation and noise removal in the example explained above.

In an embodiment, obtaining the aggregated output in step 202 may include concatenating the weighted outputs of the parallel convolution paths. If the input to the aggregated multi-scale CNN is, for example, M*(N/2+1), the dimension of the output in case of concatenating may be 3*(n_filters*n)*M*(N/2+1).

In an embodiment, obtaining the aggregated output in step 202 may include adding the weighted outputs of the parallel convolution paths. If the input to the aggregated multi-scale CNN is, for example, M*(N/2+1), the dimension of the output in case of adding may be (n_filters*n)*M*(N/2+1). It is to be noted that throughout this disclosure, for example, the filter number may be denoted as n_filters*n, as N0_filters*{1} or as $N_0*1=N_l$ for the filters of the L convolution layers of the parallel convolution paths of the CNN, whereas the filter number may be denoted as N filters or N_filters for other convolution layers.

Cascaded Pooling

Figure 5:
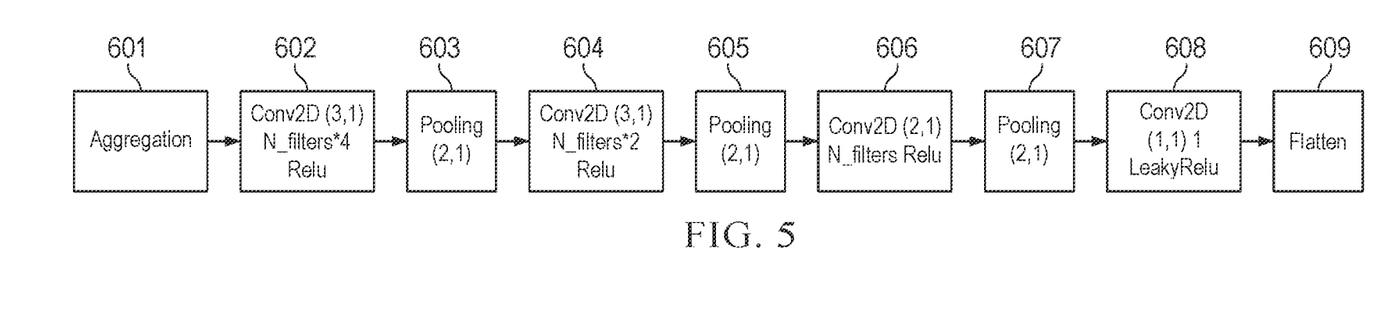
FIG. 5 illustrates an example of a cascaded pooling structure.

Since multiple frames of a time-frequency transform of an original noisy speech signal are input into the aggregated multi-scale CNN, feature extraction by the CNN is also conducted over multiple frames. Referring to the example of FIG. 5, a cascaded pooling structure is illustrated. In an embodiment, generating the output mask includes applying cascaded pooling to the aggregated output in step 601. By applying cascaded pooling, multi-frame features may be used to predict a one-frame output mask by discovering the most effective features. In an embodiment, cascaded pooling may include one or more stages of performing a pair of a convolution layer, 602, 604, 606, and pooling processing 603, 605, 607, wherein the one or more stages are followed by a last convolution layer, 608. Pooling processing may only be performed on the time axis. In an embodiment, average pooling processing may be performed as the pooling processing. In the convolution layers, 602, 604, 606, the filter number may be reduced. While the filter number in the first convolution layer, 602, is not limited, and may be, for example, N_filters*4 or N_filters*2, the filter number may be reduced gradually, if not, performance may decrease. Further, the filter number has to be 1 in the last convolution layer, 608. In the example of FIG. 5, without intended limitation, the filter number is reduced from N_filters*4 in the first of the convolution layers 602, to N_filters*2 in the second of the convolution layers 604, to N_filters in the third of the convolution layers 606, to a filter number of 1 in the last convolution layer, 608. The filter size may depend on the number of multiple frames M. Alternatively, or additionally, the filter size of each convolution layer may depend on the output frame size of the previous pooling layer. If the output frame size of the previous pooling layer is larger than the filter size on the time axis, the filter size may be the same in the respective convolution layers, for example (3,1). If the output frame size of the previous pooling layer is smaller than the filter size of the previous convolution layer on the time axis, the filter size of a current convolution layer may be (M', 1) assuming that the previous pooling layer has an M' frame output, for example, M'<3. In the example of FIG. 5, in the first convolution layer, 602, a filter size of (3,1) is used, in the second convolution layer, 604, a filter size of (3,1) is used, in the third convolution layer, 606, a filter size of (2,1) is used and in the last convolution layer, 608, a filter size of (1,1) is used. A non-linear operation may be performed in each of the convolution layers. In the example of FIG. 5, in convolution layers 602, 604 and 606 a rectified linear unit (Relu) is performed and a leaky rectified linear unit (LeakyRelu) is performed in the last convolution layer, 608. In an embodiment, a flattening operation, 609, may be performed after the cascaded pooling.

Complexity Reduction

Figure 6:
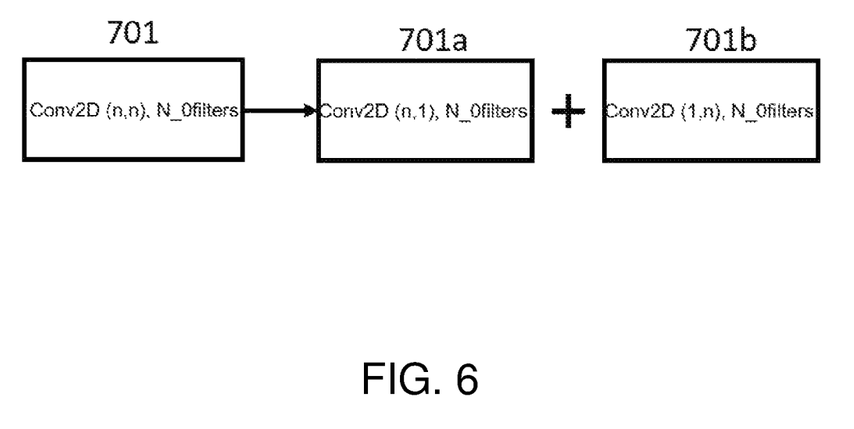
FIG. 6 illustrates an example of complexity reduction.

Referring to the example of FIG. 6, in an embodiment, for a given parallel convolution path, the filters may have a filter size of n*n, 701, or the filters may have a filter size of n*1, 701a, and 1*n, 701b. The filter may be applied in the frequency-time dimension, thereby a filter size n*n may represent a filter with n filter length in the frequency axis and n filter length in the time axis. Similarly a filter size of n*1 may represent a filter with n filter length on the frequency axis and 1 filter length in the time axis, while a filter size of 1*n may represent a filter with 1 filter length in the frequency axis and n filter length in the time axis. A filter of size n*n may be replaced by concatenation of a filter of size n*1 and a filter of size 1*n. Complexity reduction may thus be achieved as follows. For example, for a n*n filter, there are n*n parameters. If it is assumed that 64 of such filters are in one of the L layers, the number of parameters will be 64*n*n. By replacing the filter size n*n with the concatenation of two filters of size n*1 and 1*n, respectively, the parameters will be only 64*n*1*2, thereby reducing the complexity of the model.

Interpretation

Unless specifically stated otherwise, as apparent from the following discussions, it is appreciated that throughout the disclosure discussions utilizing terms such as "processing," "computing," "calculating," "determining", analyzing" or the like, refer to the action and/or processes of a computer or computing system, or similar electronic computing devices, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one example embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The processing system may also encompass a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code. Furthermore, a computer-readable carrier medium may form, or be included in a computer program product.

In alternative example embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a Personal Digital Assistant (PDA), a cellular telephone, a web appliance, a network router, switch or bridge, or any machine capable of executing a set of instructions (sequential or otherwise) that specify actions to be taken by that machine.

Note that the term "machine" shall also be taken to include any collection of machines that individually or jointly execute a set (or multiple sets) of instructions to perform any one or more of the methodologies discussed herein.

Thus, one example embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, example embodiments of the present disclosure may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present disclosure may take the form of a method, an entirely hardware example embodiment, an entirely software example embodiment or an example embodiment combining software and hardware aspects. Furthermore, the present disclosure may take the form of carrier medium (e.g., a computer program product on a computer-readable storage medium) carrying computer-readable program code embodied in the medium.

The software may further be transmitted or received over a network via a network interface device. While the carrier medium is in an example embodiment a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present disclosure. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one example embodiment by an appropriate processor (or processors) of a processing (e.g., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this disclosure to "one example embodiment", "some example embodiments" or "an example embodiment" means that a particular feature, structure or characteristic described in connection with the example embodiment is included in at least one example embodiment of the present disclosure. Thus, appearances of the phrases "in one example embodiment", "in some example embodiments" or "in an example embodiment" in various places throughout this disclosure are not necessarily all referring to the same example embodiment. Furthermore, the particular features, structures or characteristics may be combined in any suitable manner, as would be apparent to one of ordinary skill in the art from this disclosure, in one or more example embodiments.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, FIG., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

Various aspects of the present invention may be appreciated from the following enumerated example embodiments (EEEs):

EEE1. A method for Convolutional Neural Network (CNN) based speech source separation, wherein the method includes the steps of:
  (a) providing multiple frames of a time-frequency transform of an original noisy speech signal;
  (b) inputting the time-frequency transform of said multiple frames into an aggregated multi-scale CNN having a plurality of parallel convolution paths;
  (c) extracting and outputting, by each parallel convolution path, features from the input time-frequency transform of said multiple frames;
  (d) obtaining an aggregated output of the outputs of the parallel convolution paths; and
  (e) generating an output mask for extracting speech from the original noisy speech signal based on the aggregated output.

EEE2. Method according to EEE 1, wherein the original noisy speech signal includes one or more of high-pitch, cartoon and other abnormal speech.

EEE3. Method according to EEE 1 or EEE 2, wherein the time-frequency transform of said multiple frames is subjected to a 2D convolutional layer followed by a leaky rectified linear unit (LeakyRelu) prior to inputting into the aggregated multi-scale CNN.

EEE4. Method according to any of EEEs 1-3, wherein obtaining the aggregated output in step (d) further includes applying weights to respective outputs of the parallel convolution paths.

EEE5. Method according to EEE 4, wherein different weights are applied to respective outputs of the parallel convolution paths based on one or more of speech and/or audio domain knowledge and trainable parameters learned from a training process.

EEE6. Method according to EEE 4 or EEE 5, wherein obtaining the aggregated output in step (d) includes concatenating the weighted outputs of the parallel convolution paths.

EEE7. Method according to EEE 4 or EEE 5, wherein obtaining the aggregated output in step (d) includes adding the weighted outputs of the parallel convolution paths.

EEE8. Method according to any of EEEs 1-7, wherein, in step (c), speech harmonic features are extracted and output by each of the parallel convolution paths.

EEE9. Method according to any of EEEs 1-8, wherein the method further includes the step of (f) post-processing the output mask.

EEE10. Method according to EEE 9, wherein the output mask is a one-frame spectral magnitude mask, and wherein post-processing the output mask includes at least one of the steps of:
  (i) limiting the output mask to $[0, \varphi]$, wherein $\varphi$ is set according to a statistical analysis of a target mask in training data;

(ii) if a mean mask for a current frame is smaller than E, setting the output mask to be 0;
(iii) if an input is zero, setting the output mask to zero; or
(iv) J*K median filtering.

EEE11. Method according to any of EEEs 1-10, wherein the output mask is a one-frame spectral magnitude mask and the method further includes the step of (g) multiplying the output mask and a magnitude spectrum of the original noisy speech signal, conducting ISTFT and getting a way signal.

EEE12. Method according to any of EEEs 1-11, wherein generating the output mask in step (e) includes applying cascaded pooling to the aggregated output.

EEE13. Method according to EEE 12, wherein the cascaded pooling includes one or more stages of performing a pair of a convolution layer and pooling processing, wherein the one or more stages are followed by a last convolution layer.

EEE14. Method according to EEE 12 or EEE 13, wherein a flattening operation is performed after the cascaded pooling.

EEE15. Method according to any of EEEs 12-14, wherein, as the pooling processing, average pooling processing is performed.

EEE16. Method according to any of EEEs 1-15, wherein each parallel convolution path, out of the plurality of parallel convolution paths of the CNN, includes L convolution layers, wherein L is a natural number≥1, and wherein an l-th layer among the L layers has $N_l$ filters with l=1 . . . L.

EEE17. Method according to EEE 16, wherein for each parallel convolution path, the number $N_l$ of filters in the l-th layer is given by $N_l=1*N_0$, with $N_0$ a predetermined constant≥1.

EEE18. Method according to EEE 16 or EEE 17, wherein the filter size of the filters is the same within each parallel convolution path.

EEE19. Method according to EEE 18, wherein the filter size of the filters is different between different parallel convolution paths.

EEE20. Method according to EEE 19, wherein, for a given parallel convolution path, the filters have a filter size of n*n, or the filters have a filter size of n*1 and 1*n.

EEE21. Method according to EEE 19 or EEE 20, wherein the filter size depends on a harmonic length to conduct feature extraction.

EEE22. Method according to any of EEEs 16-21, wherein, for a given parallel convolution path, prior to performing the convolution operation in each of the L convolution layers, the input is zero padded.

EEE23. Method according to any of EEEs 16-22, wherein, for a given parallel convolution path, the filters of at least one of the layers of the parallel convolution path are dilated 2D convolutional filters.

EEE24. Method according to EEE 23, wherein the dilation operation of the filters of the at least one of the layers of the parallel convolution path is performed on the frequency axis only.

EEE25. Method according to EEE 23 or EEE 24, wherein, for a given parallel convolution path, the filters of two or more of the layers of the parallel convolution path are dilated 2D convolutional filters, and wherein a dilation factor of the dilated 2D convolutional filters increases exponentially with increasing layer number l.

EEE26. Method according to EEE 25, wherein, for a given parallel convolution path, a dilation is (1,1) in a first of the L convolution layers, the dilation is (1,2) in a second of the L convolution layers, the dilation is (1,2^(l−1)) in the l-th of the L convolution layers, and the dilation is (1,2^(L−1)) in the last of the L convolution layers, where (c,d) indicates a dilation factor of c along the time axis and a dilation factor of d along the frequency axis.

EEE27. Method according to any of EEEs 16-26, wherein, for a given parallel convolution path, in addition, a non-linear operation is performed in each of the L convolution layers.

EEE28. Method according to EEE 27, wherein the non-linear operation includes one or more of a parametric rectified linear unit (PRelu), a rectified linear unit (Relu), a leaky rectified linear unit (LeakyRelu), an exponential linear unit (Elu) and a scaled exponential linear unit (Selu).

EEE29. Method according to EEE 28, wherein rectified linear unit (Relu) is performed as the non-linear operation.

EEE30. Apparatus for Convolutional Neural Network (CNN) based speech source separation, wherein the apparatus includes a processor configured to perform the steps of the method according to any of EEEs 1-29.

EEE31. A computer program product comprising a computer-readable storage medium with instructions adapted to cause the device to carry out the method according to any of EEEs 1-29 when executed by a device having processing capability.

What is claimed is:

1. A method for Convolutional Neural Network (CNN) based speech source separation, wherein the method includes:
    providing multiple frames of a time-frequency transform of an original noisy speech signal;
    inputting the time-frequency transform of said multiple frames into an aggregated multi-scale CNN having a plurality of parallel convolution paths, wherein each parallel convolution path, out of the plurality of parallel convolution paths of the CNN, includes a cascade of L convolution layers, wherein L is a natural number>1, wherein an l-th layer among the L layers has $N_l$ filters with l=1 . . . L, wherein the filter size of the filters is different between different parallel convolution paths and wherein the filter size of the filters is the same within each parallel convolution path;
    extracting and outputting, by each parallel convolution path, features from the input time-frequency transform of said multiple frames;
    obtaining an aggregated output of the outputs of the parallel convolution paths; and
    generating an output mask for extracting speech from the original noisy speech signal based on the aggregated output.

2. Method according to claim 1, wherein the time-frequency transform of said multiple frames is subjected to a 2D convolutional layer followed by a leaky rectified linear unit (LeakyRelu) prior to inputting into the aggregated multi-scale CNN.

3. Method according to claim 1, wherein obtaining the aggregated output further includes applying weights to respective outputs of the parallel convolution paths.

4. Method according to claim 3, wherein different weights are applied to respective outputs of the parallel convolution paths based on one or more of speech and/or audio domain knowledge and trainable parameters learned from a training process.

5. Method according to claim 3, wherein obtaining the aggregated output includes concatenating the weighted outputs of the parallel convolution paths.

6. Method according to claim 3, wherein obtaining the aggregated output includes adding the weighted outputs of the parallel convolution paths.

7. Method according to claim 1, wherein, in the step of extracting and outputting features, speech harmonic features are extracted and output by each of the parallel convolution paths.

8. Method according to claim 1, wherein the method further includes the step of post-processing the output mask.

9. Method according to claim 8, wherein the output mask is a one-frame spectral magnitude mask, and wherein post-processing the output mask includes at least one of the steps of:
limiting the output mask to [0, φ], wherein φ is set according to a statistical analysis of a target mask in training data;
if a mean mask for a current frame is smaller than ε, setting the output mask to be 0;
if an input is zero, setting the output mask to zero; or
a median filtering with size J*K, wherein J is an integer representing the size in the frequency dimension and K is an integer representing the size in the time dimension.

10. Method according to claim 1, wherein the output mask is a one-frame spectral magnitude mask and the method further includes the step of multiplying the output mask and a magnitude spectrum of the original noisy speech signal, conducting ISTFT and getting a way signal.

11. Method according to claim 1, wherein generating the output mask includes applying cascaded pooling to the aggregated output.

12. Method according to claim 11, wherein the cascaded pooling includes one or more stages of performing a pair of a convolution layer and pooling processing, wherein the one or more stages are followed by a last convolution layer.

13. Method according to claim 11, wherein a flattening operation is performed after the cascaded pooling.

14. Method according to claim 11, wherein, as the pooling processing, average pooling processing is performed.

15. Method according to claim 11, wherein for each parallel convolution path, the number Ni of filters in the l-th layer is given by $N_l = l*N_0$, with $N_0$ a predetermined constant≥1.

16. Method according to claim 1, wherein, for a given parallel convolution path, the filters have a filter size of n*n, or the filters have a filter size of n*1 and 1*n.

17. Method according to claim 1, wherein, for a given parallel convolution path, prior to performing the convolution operation in each of the L convolution layers, the input is zero padded.

18. Method according to claim 1, wherein, for a given parallel convolution path, the filters of at least one of the layers of the parallel convolution path are dilated 2D convolutional filters.

19. Method according to claim 18, wherein the dilation operation of the filters of the at least one of the layers of the parallel convolution path is performed on the frequency axis only.

20. Method according to claim 18, wherein, for a given parallel convolution path, the filters of two or more of the layers of the parallel convolution path are dilated 2D convolutional filters, and wherein a dilation factor of the dilated 2D convolutional filters increases exponentially with increasing layer number l.

21. Method according to claim 20, wherein, for a given parallel convolution path, a dilation is (1,1) in a first of the L convolution layers, the dilation is (1,2) in a second of the L convolution layers, the dilation is (1,2^(l−1)) in the l-th of the L convolution layers, and the dilation is (1,2^(L−1)) in the last of the L convolution layers, where (c,d) indicates a dilation factor of c along the time axis and a dilation factor of d along the frequency axis.

22. Method according to claim 1, wherein, for a given parallel convolution path, in addition, a non-linear operation is performed in each of the L convolution layers.

23. Method according to claim 2, wherein the non-linear operation includes one or more of a parametric rectified linear unit (PRelu), a rectified linear unit (Relu), a leaky rectified linear unit (LeakyRelu), an exponential linear unit (Elu) and a scaled exponential linear unit (Selu).

24. Method according to claim 23, wherein rectified linear unit (Relu) is performed as the non-linear operation.

25. Apparatus for Convolutional Neural Network (CNN) based speech source separation, wherein the apparatus includes a processor configured to perform the method according to claim 1.

26. A computer program product comprising a non-transitory computer-readable storage medium with instructions adapted to cause the device to carry out the method according to claim 1 when executed by a device having processing capability.

* * * * *

UNITED STATES PATENT AND TRADEMARK OFFICE
CERTIFICATE OF CORRECTION

PATENT NO. : 12,073,828 B2
APPLICATION NO. : 17/611121
DATED : August 27, 2024
INVENTOR(S) : Jundai Sun Page 1 of 1

It is certified that error appears in the above-identified patent and that said Letters Patent is hereby corrected as shown below:

On the Title Page

Column 1, (30) Foreign Application Priority Data, Line 1, delete "(WO)" and insert --(CN)--.

In the Claims

Column 17, Claim 15, Line 39, delete "claim 11" and insert --claim 1--.

Column 17, Claim 15, Line 40, delete "Ni" and insert --$N_l$--.

Signed and Sealed this
Tenth Day of December, 2024

Katherine Kelly Vidal
*Director of the United States Patent and Trademark Office*